(12) United States Patent
Christiano

(10) Patent No.: US 12,030,371 B2
(45) Date of Patent: Jul. 9, 2024

(54) TRUNK OR TAILGATE OPENING ASSEMBLY

(71) Applicant: Tyco Electronics Brasil Ltda., Braganca Paulista (BR)

(72) Inventor: Fabio Fortunato Christiano, Braganca Paulista (BR)

(73) Assignee: Tyco Electronics Brasil LTDA (BR)

( * ) Notice: Subject to any disclaimer, the term of this patent is extended or adjusted under 35 U.S.C. 154(b) by 495 days.

(21) Appl. No.: 16/897,442

(22) Filed: Jun. 10, 2020

(65) Prior Publication Data
US 2021/0387518 A1   Dec. 16, 2021

(51) Int. Cl.
*B60J 5/10*   (2006.01)
*E05B 85/10*   (2014.01)

(52) U.S. Cl.
CPC ............ *B60J 5/107* (2013.01); *E05B 85/10* (2013.01)

(58) Field of Classification Search
CPC ........ E05B 85/26; E05B 85/243; E05B 77/36; E05B 81/20; E05B 81/50; E05C 3/004; E05C 3/12; B60N 2/20; B60N 2/2245
See application file for complete search history.

(56) References Cited

U.S. PATENT DOCUMENTS

| | | | | |
|---|---|---|---|---|
| 4,331,852 A * | 5/1982 | Baran | ............... | H01H 9/047 |
| | | | | 200/515 |
| 6,250,694 B1 * | 6/2001 | Weiland | ............... | E05C 19/022 |
| | | | | 292/121 |
| 2006/0186677 A1 * | 8/2006 | Bella | ............... | E05B 77/06 |
| | | | | 292/304 |
| 2006/0279095 A1 * | 12/2006 | Ishiguro | ............... | E05B 81/76 |
| | | | | 292/336.3 |
| 2013/0290035 A1 * | 10/2013 | Jones | ............... | G06Q 10/10 |
| | | | | 705/4 |
| 2013/0327624 A1 * | 12/2013 | Volpato | ............... | H01H 13/14 |
| | | | | 200/529 |
| 2018/0130619 A1 * | 5/2018 | Neese | ............... | H01H 9/0271 |
| 2019/0360243 A1 | 11/2019 | Bonucci | | |
| 2022/0076902 A1 * | 3/2022 | Nakamura | ............... | H01H 13/10 |

FOREIGN PATENT DOCUMENTS

WO   WO-2004057135 A2 *   7/2004   ............ E05B 81/76

* cited by examiner

*Primary Examiner* — Kristina R Fulton
*Assistant Examiner* — Thomas L Neubauer

(57) ABSTRACT

An adapter for mounting a sealed trunk or tailgate opening assembly in a vehicle. The adapter includes a planar bracket with a release assembly receiving area. The release assembly receiving area has a first positioning member and a second positioning member. The first positioning member and the second position member cooperate with the sealed trunk or tailgate opening assembly to prevent the sealed trunk or tailgate opening assembly from moving in a direction which is parallel to the first surface of the bracket. Resilient mounting projections extend from the bracket. The resilient mounting projections have latching projections proximate free ends thereof, the latching projections of the resilient mounting projections cooperate with an opening of the vehicle to mount the adapter in the opening of the vehicle.

7 Claims, 11 Drawing Sheets

_US 12,030,371 B2_

TRUNK OR TAILGATE OPENING ASSEMBLY

FIELD OF THE INVENTION

The invention relates to a trunk or tailgate opening assembly. In particular, the invention relates to a handle assembly which includes an adapter for mounting to different vehicles.

BACKGROUND OF THE INVENTION

Many vehicles sold today are SUVs, pickup trucks or other types of multi-purpose vehicles (MPVs) which include a tailgate at the rear of the vehicle. The tailgate handle assemblies provided on a surface of the tailgates which are exposed to moisture, dirt and other elements which can be harmful to the operation of the tailgate handle assemblies. In addition, tailgate handle assemblies may also be exposed to items, such as chains, which may interact with the tailgate handle assemblies to cause damage to the tailgate handle assemblies.

In addition, other vehicles, such as sedan, convertibles and station wagons include a trunk or hatchback which handle assemblies provided which are also exposed to moisture, dirt and other elements which can be harmful to the operation of the handle assemblies.

It would be beneficial to provide a trunk or tailgate opening or handle assembly which is compact and sealed to prevent the elements and other items from causing the failure of the handle assemblies and which can be used with an adapter to be mounted to different types of vehicles.

SUMMARY OF THE INVENTION

An embodiment is directed to an adapter for mounting a sealed trunk or tailgate opening assembly in a vehicle. The adapter includes a planar bracket having a first surface and an oppositely facing second surface. A release assembly receiving area is provided on the first surface of the bracket. The release assembly receiving area has a first positioning member and a second positioning member. The first positioning member and the second positioning member extend from the first surface of the bracket in a direction away from the second surface of the bracket. The first positioning member and the second position member cooperate with the sealed trunk or tailgate opening assembly to prevent the sealed trunk or tailgate opening assembly from moving in a direction which is parallel to the first surface of the bracket. Resilient mounting projections extend from the second surface of the bracket. The resilient mounting projections have latching projections proximate free ends thereof, the latching projections of the resilient mounting projections cooperate with an opening of the vehicle to mount the adapter in the opening of the vehicle.

An embodiment is directed to a trunk or tailgate opening assembly having a sealed handle assembly and an adapter. The sealed handle assembly includes a housing and a circuit board positioned in the housing. A switch is positioned in the housing and is configured to complete an electrical circuit path on the circuit board. Resin material encompasses the circuit board. The resin material is configured to seal the connection between the circuit board and the switch. The adapter includes a planar bracket, a cover and a seal. The planar bracket has a sealed handle assembly receiving area. Resilient mounting projections extend from the bracket to mount the adapter in an opening of the vehicle. Resilient cover retaining projections extend from opposite ends of the bracket to mount the cover to the bracket.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
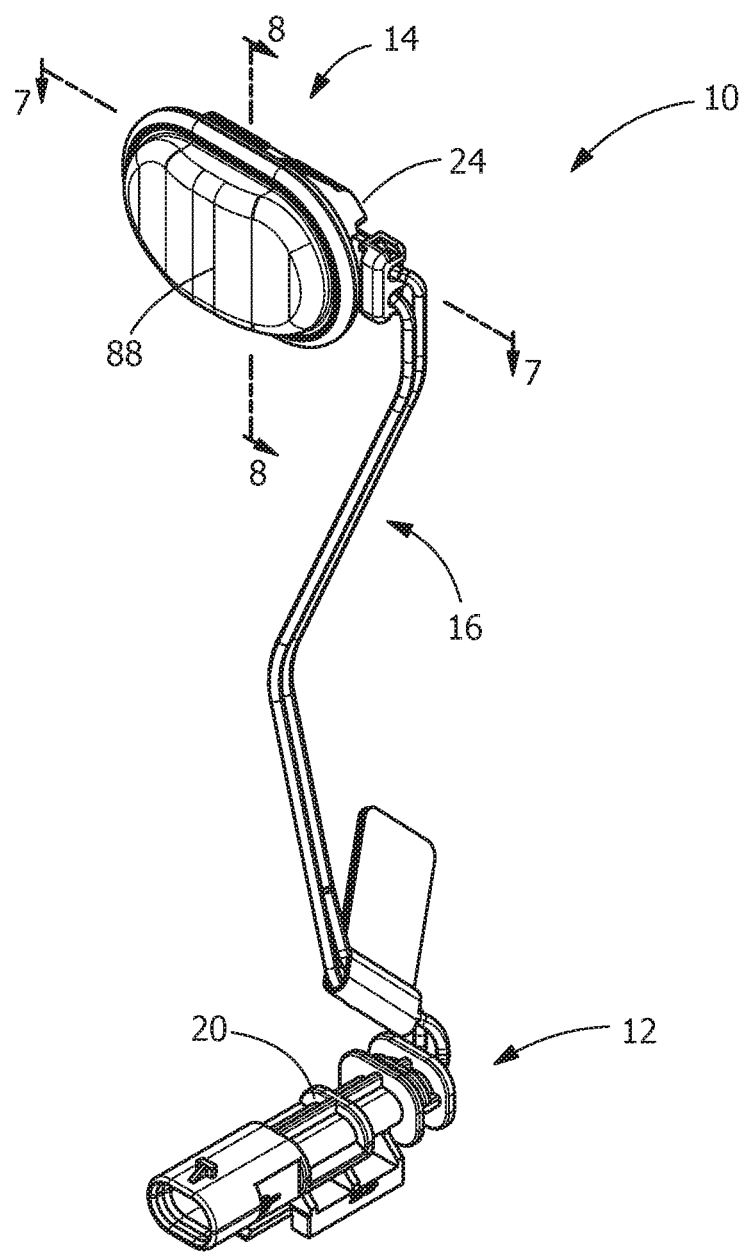
FIG. 1 is a perspective view of an illustrative view of a trunk or tailgate release assembly with an illustrative sealed trunk or tailgate handle of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 2:
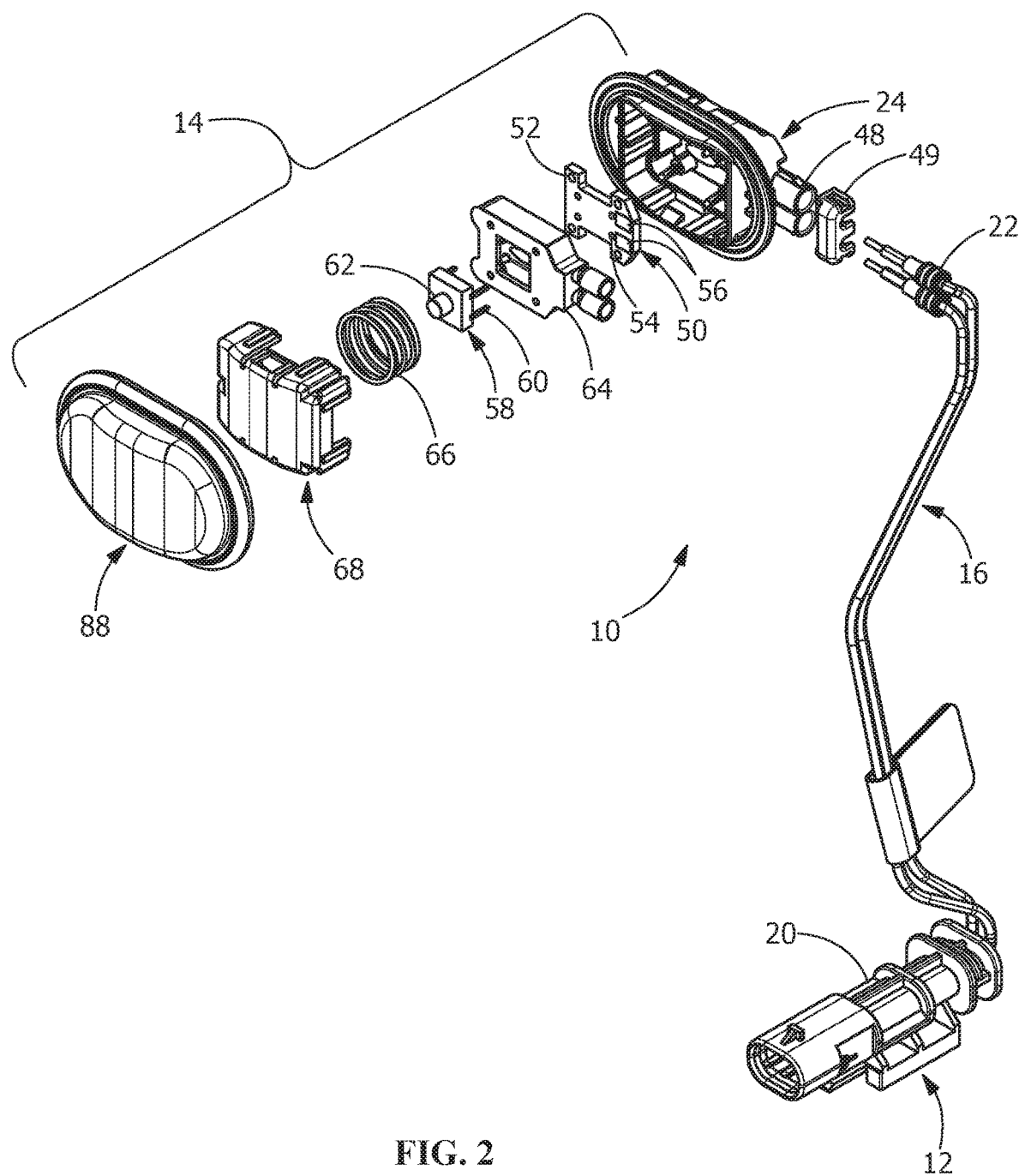
FIG. 2 is an exploded perspective view of the release assembly and the sealed handle of FIG. 1.

As shown in FIGS. 1 and 2, a tailgate or trunk release assembly 10 is shown. The tailgate or trunk release assembly 10 has a connector tab assembly 12 and a sealed tailgate or trunk handle assembly 14. A cable 16 extends between, and electrical interconnects, the connector tab assembly 12 and the sealed tailgate or trunk handle assembly 14. Terminals (not shown) are provided at a first end of the cable 16. The terminals are positioned in a housing 20 of the connector tab assembly. Seals 22 are provided at a second end of the cable 16 which has exposed conductors extending therefrom. The seals 22 and the exposed conductors are positioned in a housing 24 of the sealed tailgate or trunk handle assembly 14.

Figure 3:
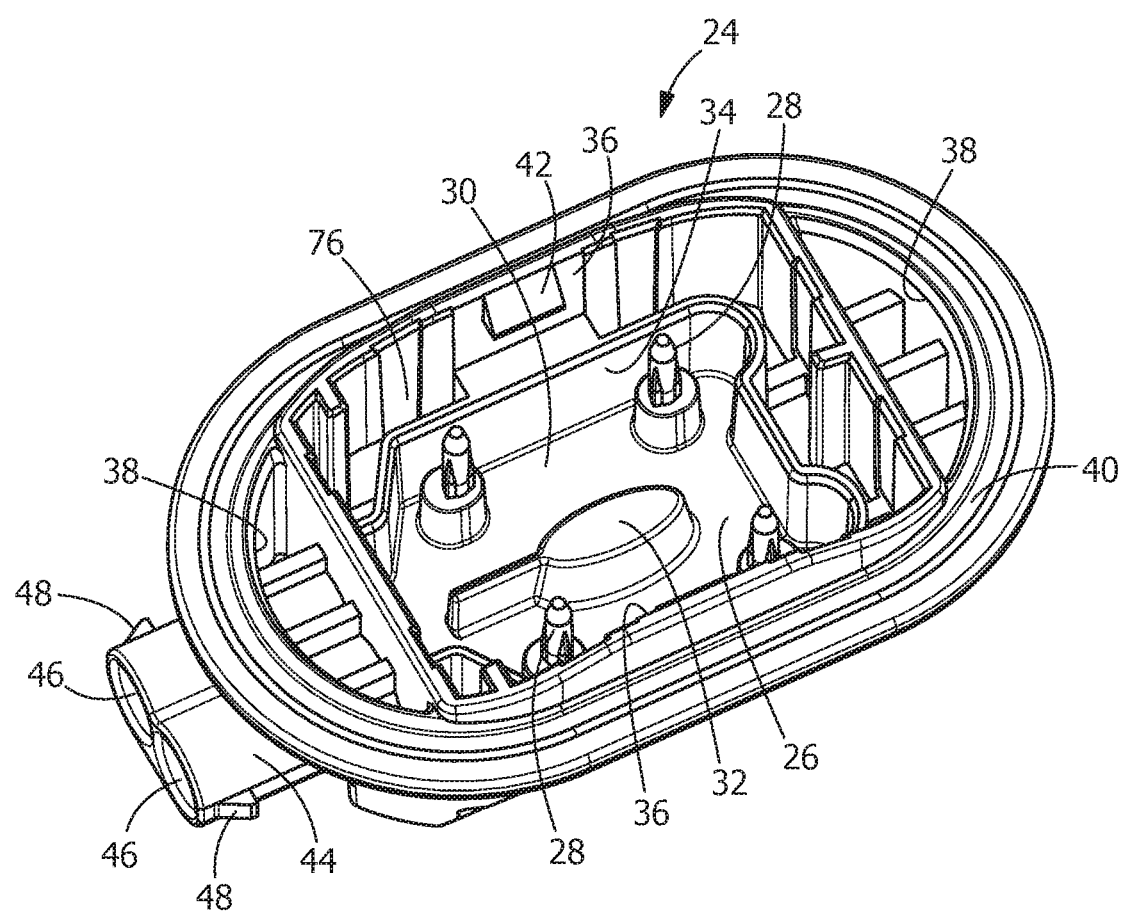
FIG. 3 is a perspective view of an illustrative housing of the sealed handle.

As shown in FIG. 3, the sealed tailgate handle assembly 14 has a housing 24 with a circuit board receiving area 26. Circuit board receiving posts 28 are positioned in the circuit board receiving area 26 and extend from a bottom wall 30 of the housing 24. A circuit board support 32 is positioned proximate the center of the circuit board receiving area 26. The circuit board support 32 extends from the bottom wall 30 of the housing 24. An interior wall 34 extends proximate the periphery of the circuit board receiving area 26.

Sidewalls 36 and end walls 38 extend from the bottom wall 30 to an upper surface 40 of the housing 24. In the illustrative embodiment shown, the sidewalls 36 are essentially parallel to each other, and the end walls 38 have arcuate configurations. Cover latching projections 42 extend from the sidewalls 36.

Terminal receiving projections 44 extend from a respective end wall 38. The terminal receiving projections 44 have terminal receiving openings 46 which extend through the terminal receiving projections 44 and through the respective end wall 38 of the housing 24 to allow terminals to be positioned therein. Retainer latching projections 48 are provided on the terminal receiving projections 44. A seal retainer 49 cooperates with the retainer latching projections 48 to retain the seal retainer 49 in position. The seal retainer 49 retains the cable 16 and seal 22 is position, as shown in FIG. 4.

Figure 4:
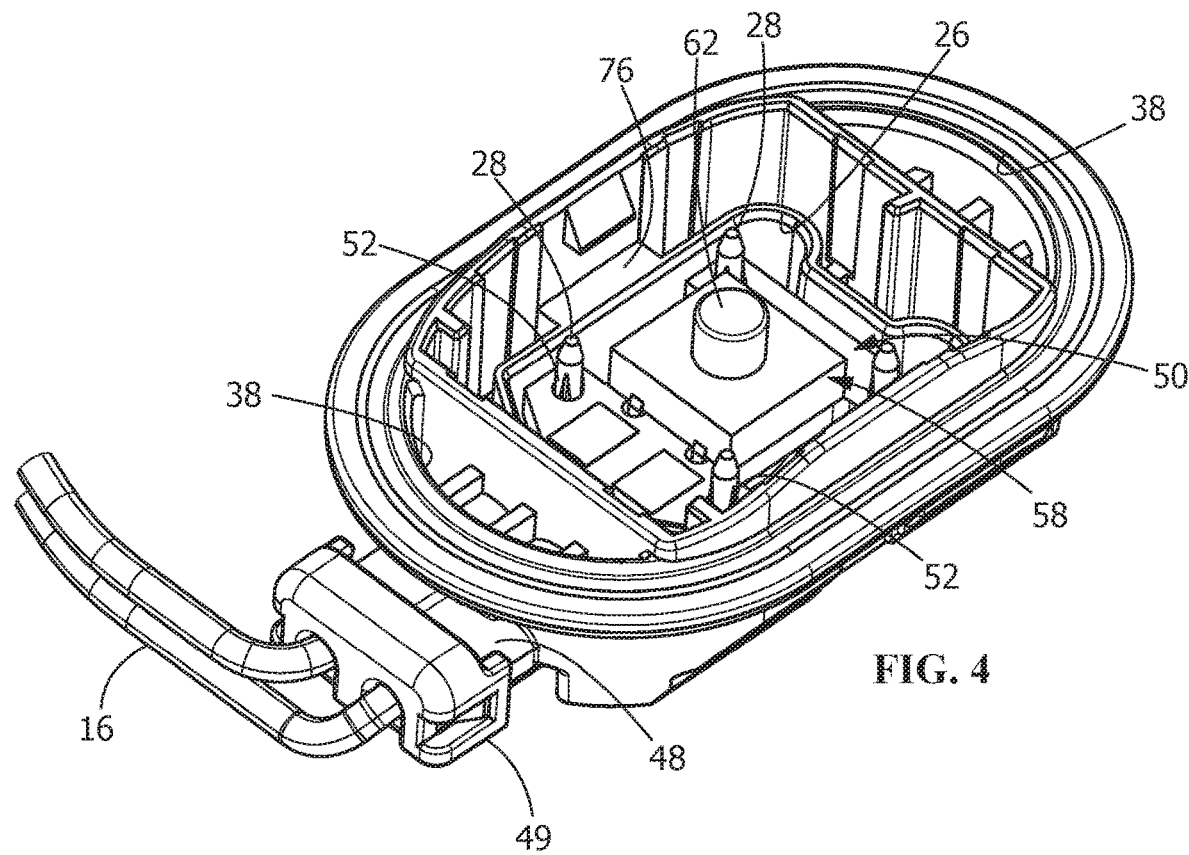
FIG. 4 is a perspective view of the housing of FIG. 3 with a circuit board and tactile electromechanical switch provided therein.

As shown in FIG. 4, a circuit board 50 is positioned in the circuit board receiving area 26. The circuit board 50 has openings 52 positioned proximate the perimeter thereof. The openings 52 cooperate with the circuit board receiving posts 28 to position the circuit board 50 in the circuit board receiving area 26. A bottom surface of the circuit board 50 is positioned in engagement with the circuit board support 32 to properly position the circuit board in the circuit board receiving area 26. As shown in FIG. 2, the circuit board 50 has plated through holes 54 and pads 56 provided thereon.

A tactile electromechanical switch 58 is provided in electrical and mechanical engagement with the circuit board 50. Mounting legs 60 extend from switch 58. The mounting legs 60 are configured to be inserted into and make electrical connections with through holes 54 of the circuit board 50. An activation button 62 extends from the tactile electromechanical switch 58 in a direction away from the circuit board 50.

During assembly of the sealed tailgate handle assembly 14, the exposed ends of the second ends of the cable 16 are positioned through the terminal receiving openings 46 such that the exposed ends of the second ends are placed in electrical engagement with the pads 56 of the circuit board 50. The exposed ends of the second ends of the cable 16 are soldered or welded to the pads 56 to maintain the exposed ends of the second ends of the cable 16 in electrical engagement with the pads 56. The seals 22 cooperate with the terminal receiving projections 44 to provide a seal therebetween.

With the exposed ends of the second ends of the cable 50, the circuit board 50 and the tactile electromechanical switch 58 properly positioned in the housing 24, a resin material 64 is placed in the circuit board receiving area 26. The resin material 64 encompasses the circuit board 50, sealing the connection between the exposed ends of the second ends of the cable 16 and the circuit board 50 and sealing the connection between the circuit board 50 and the tactile electromechanical switch 58.

A resilient member or spring 66 is positioned around the periphery of the tactile electromechanical switch 58. The spring 66 rests on the resin material 64.

Figure 5:
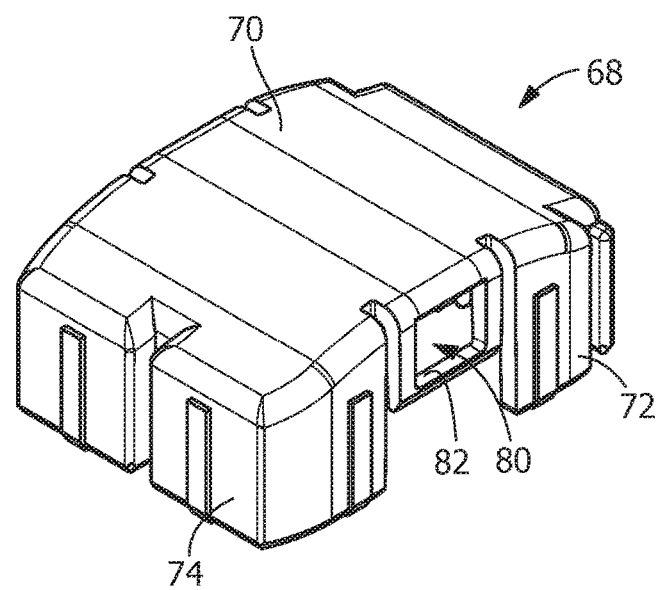
FIG. 5 is a perspective view of an illustrative intermediate cover of the sealed handle.
Figure 7:
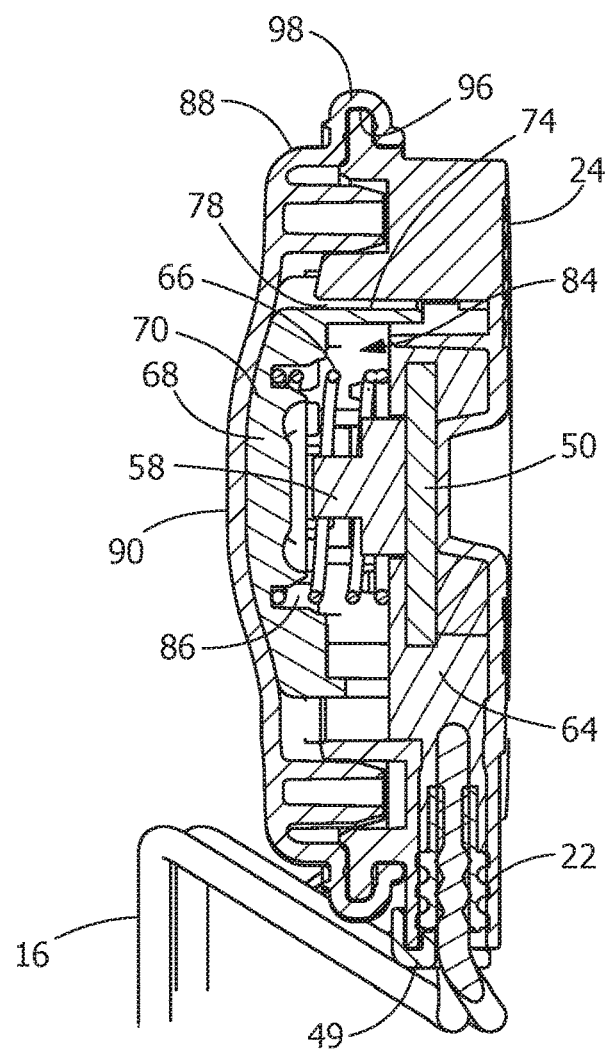
FIG. 7 is a cross-sectional view of the sealed handle of FIG. 1, taken along line 7-7, showing the sealed handle in an initial or non-compressed position.
Figure 8:
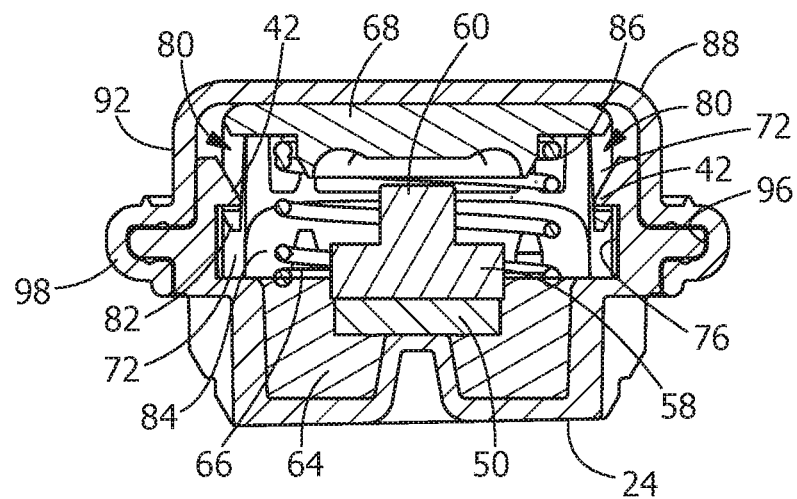
FIG. 8 is a cross-sectional view of the sealed handle of FIG. 1, taken along line 8-8, showing the sealed handle in the initial or non-compressed position.

As shown in FIG. 5, an inner cover 68 has a curved or non-linear upper wall 70. Sidewalls 72 and end walls 74 extend from the upper wall 70. The sidewalls 72 and the end walls 74 are essentially perpendicular to the upper wall 70. As shown in FIGS. 7 and 8, the sidewalls 72 are positioned in slots 76 between the interior wall 34 of the circuit board receiving area 26 and the sidewalls 36 of the housing 24. Similarly, the end walls 74 are also retained in slots 78 in the housing 24. The sidewalls 72 and the end walls 74 are slidably received in the slots 76, 78 to allow the inner cover 68 to move relative to the housing 24, the circuit board 50 and the tactile electromechanical switch 58. The movement of the inner cover 68 is in a direction which is essentially perpendicular to the bottom wall 30 of the housing 24.

Latch receiving openings 80 are provided on the sidewalls 72 of the inner cover 68. The latch receiving openings 80 have latch engaging surfaces 82 which are configured to engage the cover latching projections 42. The latch receiving openings 80 are configured to receive the cover latching projections 42 therein.

The inner cover 68 has a switch receiving recess 84 provided between the sidewalls 72 and the end walls 74 which is dimensioned to receive the tactile electromechanical switch 58 and the spring 66 therein. Spring receiving recesses 86 extend from the switch receiving recess 84 and are dimensioned to receive and retain spring 66 in proper position relative to the inner cover 68.

Figure 6:
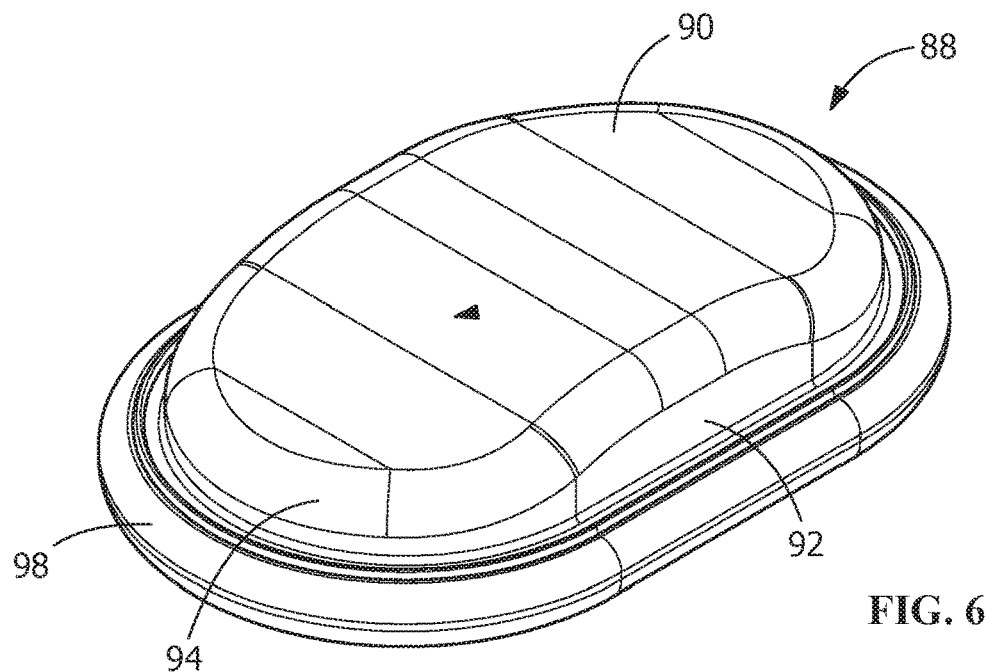
FIG. 6 is a perspective view of an illustrative outer cover of the sealed handle.

Referring to FIGS. 6 and 7, as the inner cover 68 in inserted into the housing 24, the sidewalls 72 are movably positioned in slots 76, and the end walls 74 are movably positioned in the slots 78. The cover latching projections 42 are positioned in the latch receiving openings 80. In the initial or non-compressed position, the spring 66 cooperates with the upper wall 70 of the inner cover 68 to bias the cover away from the tactile electromechanical switch 58. However, the cooperation of the cover latching projections 42 with the latch engaging surfaces 82 of the latch receiving openings 80 prevents the removal of the inner cover 68 from the housing 24 and retains the inner cover 68 in the initial or non-compressed position.

Figure 9:
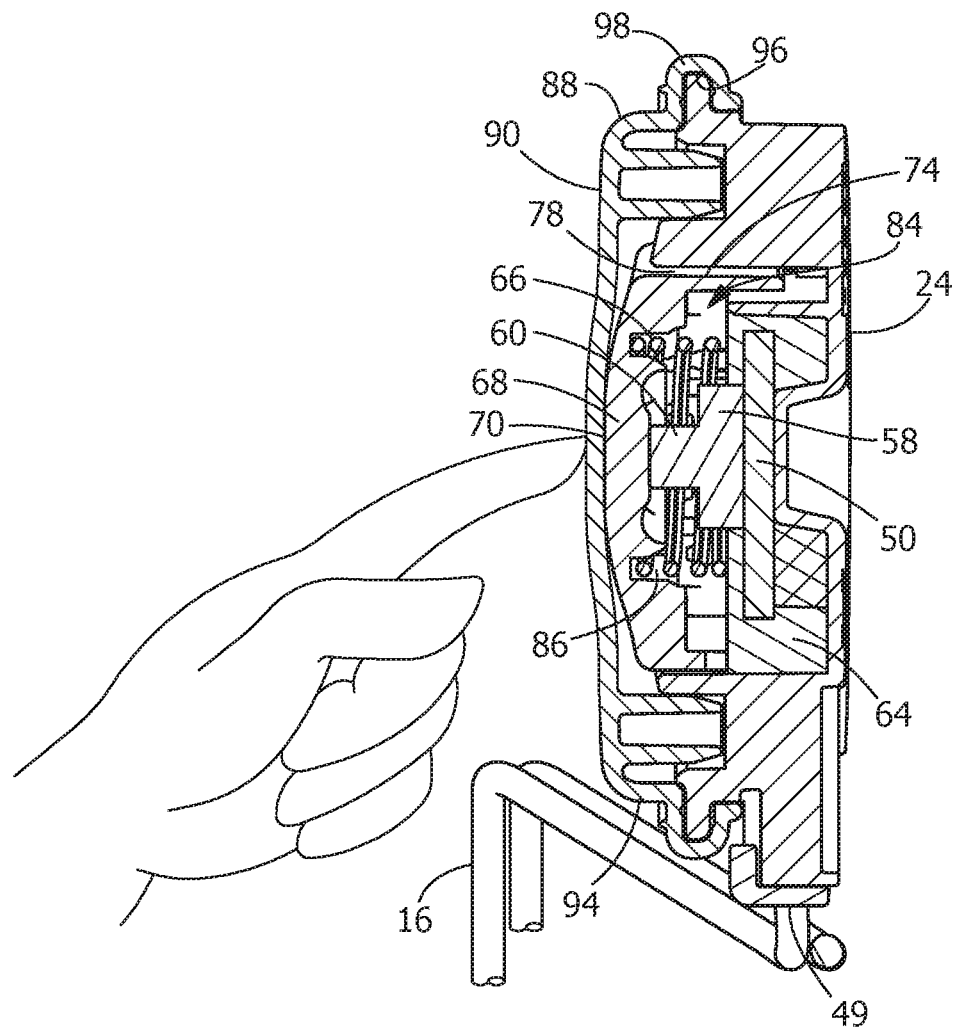
FIG. 9 is a cross-sectional view of the sealed handle, similar to that of FIG. 7, showing the sealed handle in second or compressed position.

As shown in FIG. 6, an outer cover 88 has a deformably curved or non-linear upper wall 90. Sidewalls 92 and end walls 94 extend from the upper wall 90. The sidewalls 92 and the end walls 94 are essentially perpendicular to the upper wall 90. As shown in FIGS. 7 through 9, the sidewalls 92 and end walls 94 have housing retaining slots 96 provided in housing retaining members 98. The outer cover 88 is made from material which is waterproof and which is not rigid, such as, but not limited to, rubber. The non-rigid flexible material allows the housing retaining members 98 and the retaining slots 96 to be mounted on and conform to the upper surface 40 of the housing 24 to provide a seal between the outer cover 88 and the housing 24, thereby preventing moisture or other contaminants from entering the housing.

As shown in FIGS. 7 and 8, with the outer cover 88 properly inserted onto the housing 24, the outer cover 88 and the inner cover 68 are retained in the initial or non-compressed position. Upon an application of a force, as shown in FIG. 9, the upper wall 90 of the outer cover 88 is deformed, causing the inner cover to move from the initial or non-compressed position, shown in FIGS. 7 and 8, to the second or compressed position, shown in FIG. 9. As this occurs, the applied force causes the spring 66 to compress, allowing the inner cover 68 to move toward and engage the activation button 62 of the tactile electromechanical switch 58. Continued movement of the outer cover 88 and inner cover 68 toward the bottom wall 30 of the housing 24 causes the tactile electromechanical switch 58 to complete an electrical circuit path on the circuit board 50, allowing the tactile electromechanical switch 58 to send a signal via the circuit board 50 and cable 16 to the tailgate release assembly 12 to release the tailgate.

After the pressure applied to the outer cover 88 is released, the spring returns toward the unstressed position shown in FIG. 7, thereby forcing the inner cover 68 to the initial or non-compressed position and moving the inner cover 68 from engagement with the activation button 62 of the tactile electromechanical switch 58.

Figure 10:
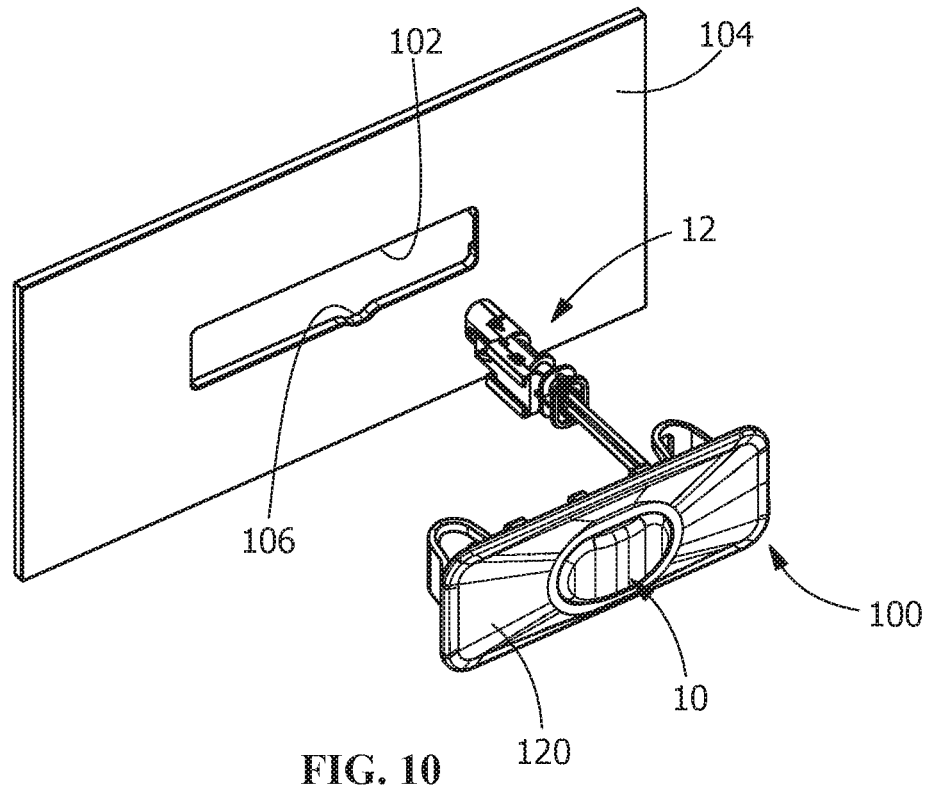
FIG. 10 is a perspective view of the sealed handle of FIG. 1 mounted in an illustrative mounting adapter.
Figure 11:
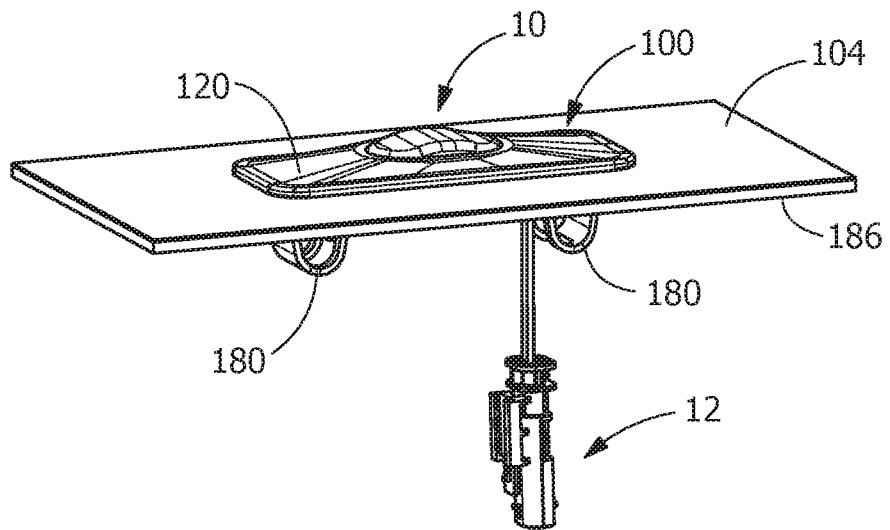
FIG. 11 is a perspective view of the sealed handle and mounting adapter of FIG. 10 position proximate to an opening in a panel.

As shown in FIGS. 10 and 11, the tailgate or trunk release assembly 10 is mounted in a mounting adapter 100. The mounting adapter 100 is configured to be mounted in an opening 102 of a panel 104 of a vehicle (not shown) to facilitate the opening of a tailgate or trunk of the vehicle. As shown in FIG. 10, the opening 102 has a rectangular configuration. However, the opening 102 may have other configurations without departing from the scope of the invention. The opening 102 has a keying area 106. As shown in FIG. 10, the keying area 106 is a recess, but other configurations of the keying area 106 may be used.

Figure 12:
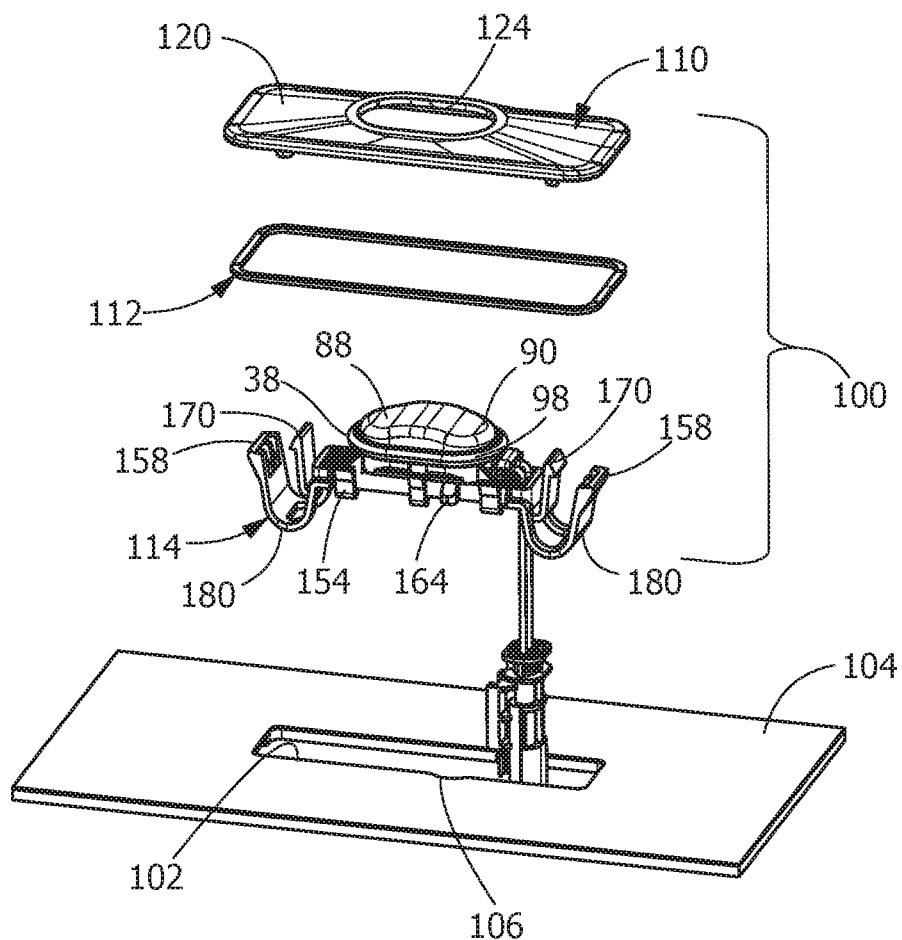
FIG. 12 is an exploded perspective view of the mounting adapter.
Figure 13:
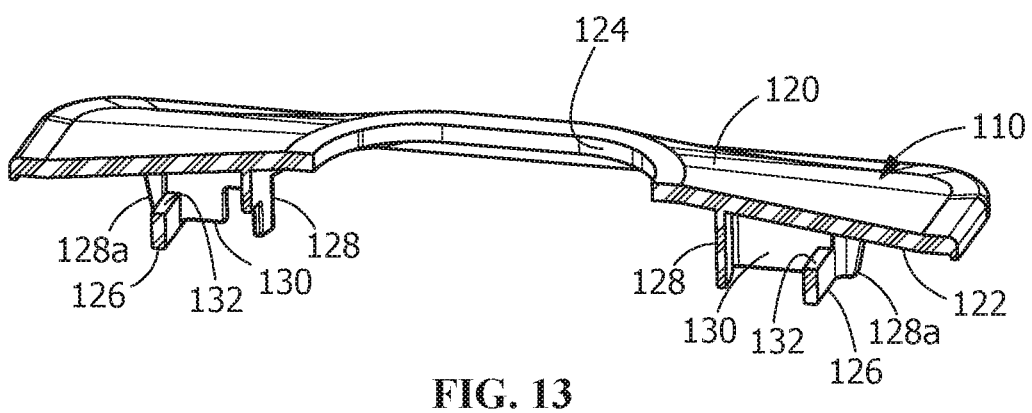
FIG. 13 is a cross-sectional perspective view of a cover of the mounting adapter.
Figure 16:
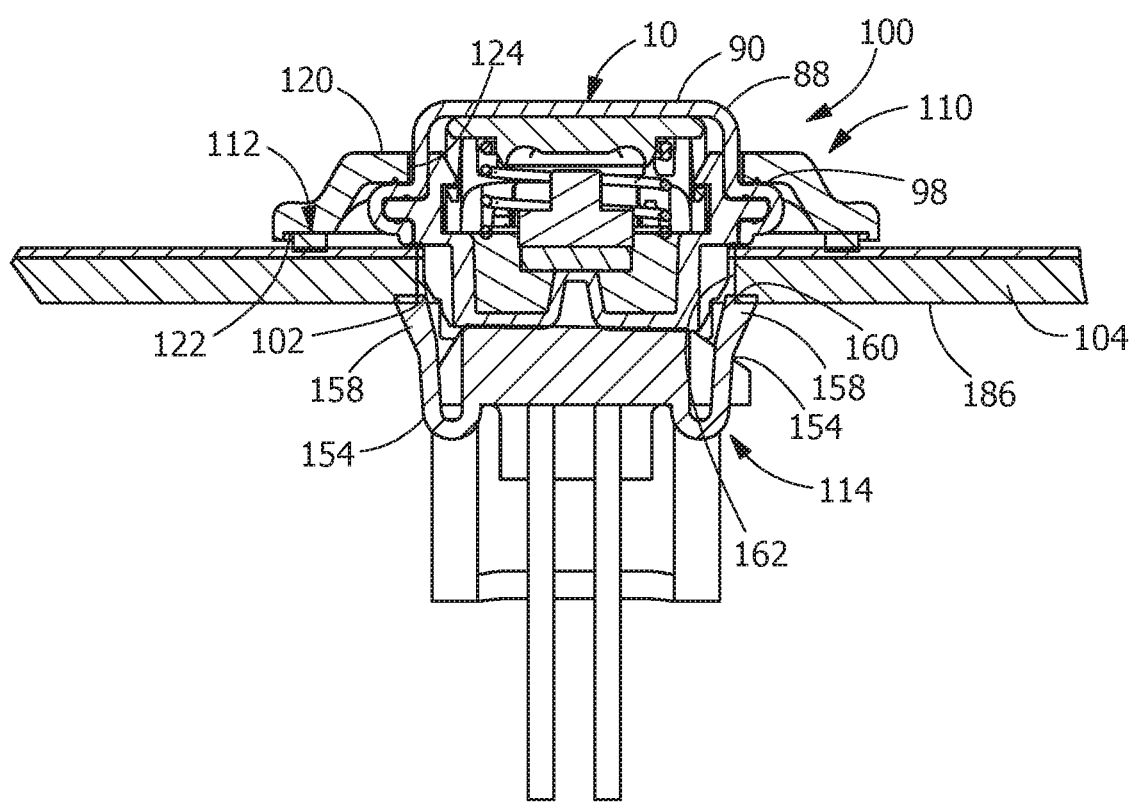
FIG. 16 is a cross-section view of the sealed handle and the mounting adapter mounted in the opening of the panel taken in a direction perpendicular to the longitudinal axis of the mounting adapter.

Referring to FIG. 12, the mounting adapter 100 has a cover 110, a seal 112 and a mounting bracket 114. Referring to FIG. 13, the cover 110 has a first surface 120 and an oppositely facing second surface 122. A tailgate or trunk release assembly receiving opening 124 extends from the first surface 120 to the second surface. As shown in FIG. 16, the opening 124 is dimensioned to allow the deformably curved or non-linear upper wall 90 of the cover 88 to extend therethrough, with the housing retaining member 98 engaging the second surface 122 of the cover 110. As the outer cover 88 is made from material which is waterproof and which is not rigid, the engagement of the housing retaining member 98 of the outer cover 88 and the second surface 122 of the cover 110 creates a seal therebetween to prevent the ingress of moisture or other contaminants.

As shown in FIG. 13, the cover 110 has mounting members 126 which extend from the second surface 122 in a direction away from the first surface 120. The mounting members 126 have side walls 128 which form a retaining projection receiving openings 130. A respective side wall 128*a* of each retaining projection receiving opening 130 has a shoulder 132 which extends into the opening 130.

The seal 112 is made from material which is waterproof and which is not rigid, whereby when compressed between the cover 110 and the panel 104, the seal 112 prevents the ingress of moisture or other contaminants. When fully assembled the housing retaining member 98 and the seal 112 prevent the ingress of moisture or other contaminants past the cover 110 of the mounting adapter 100.

Figure 14:
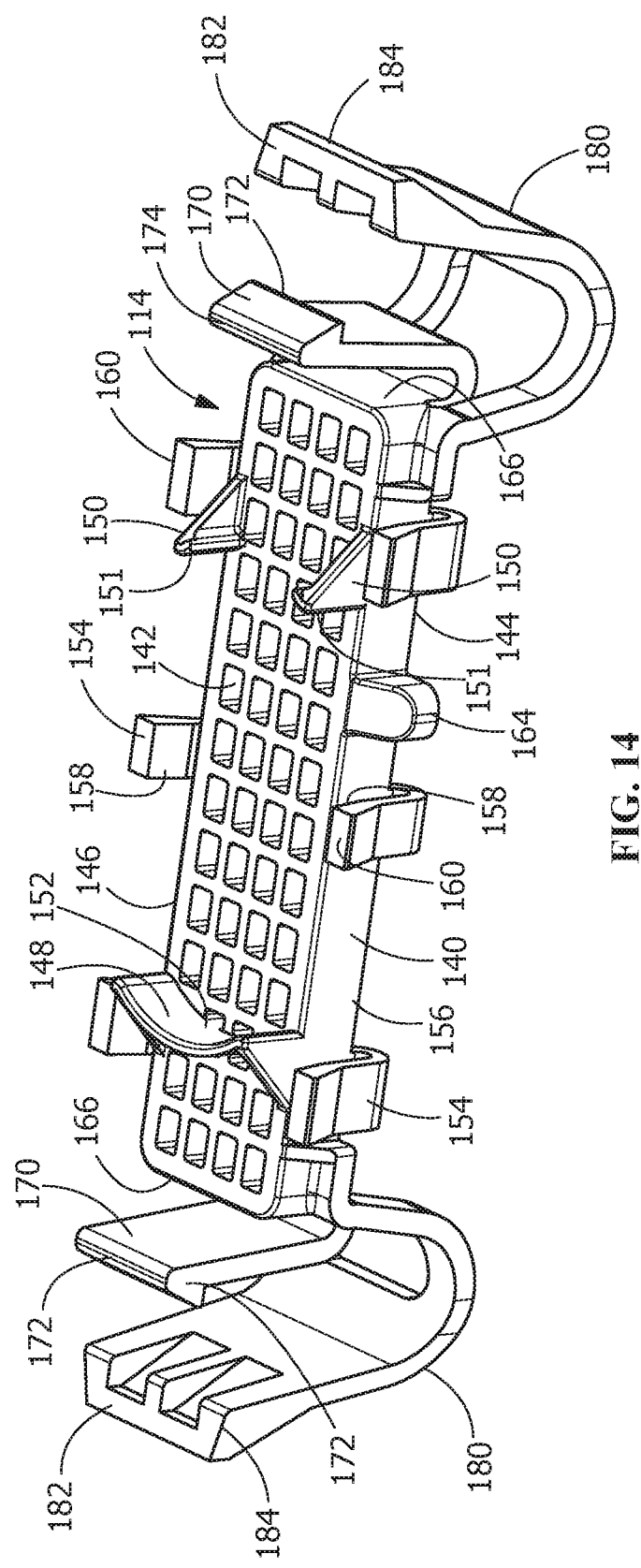
FIG. 14 is a top and side perspective view of a mounting bracket of the mounting adapter.
Figure 15:
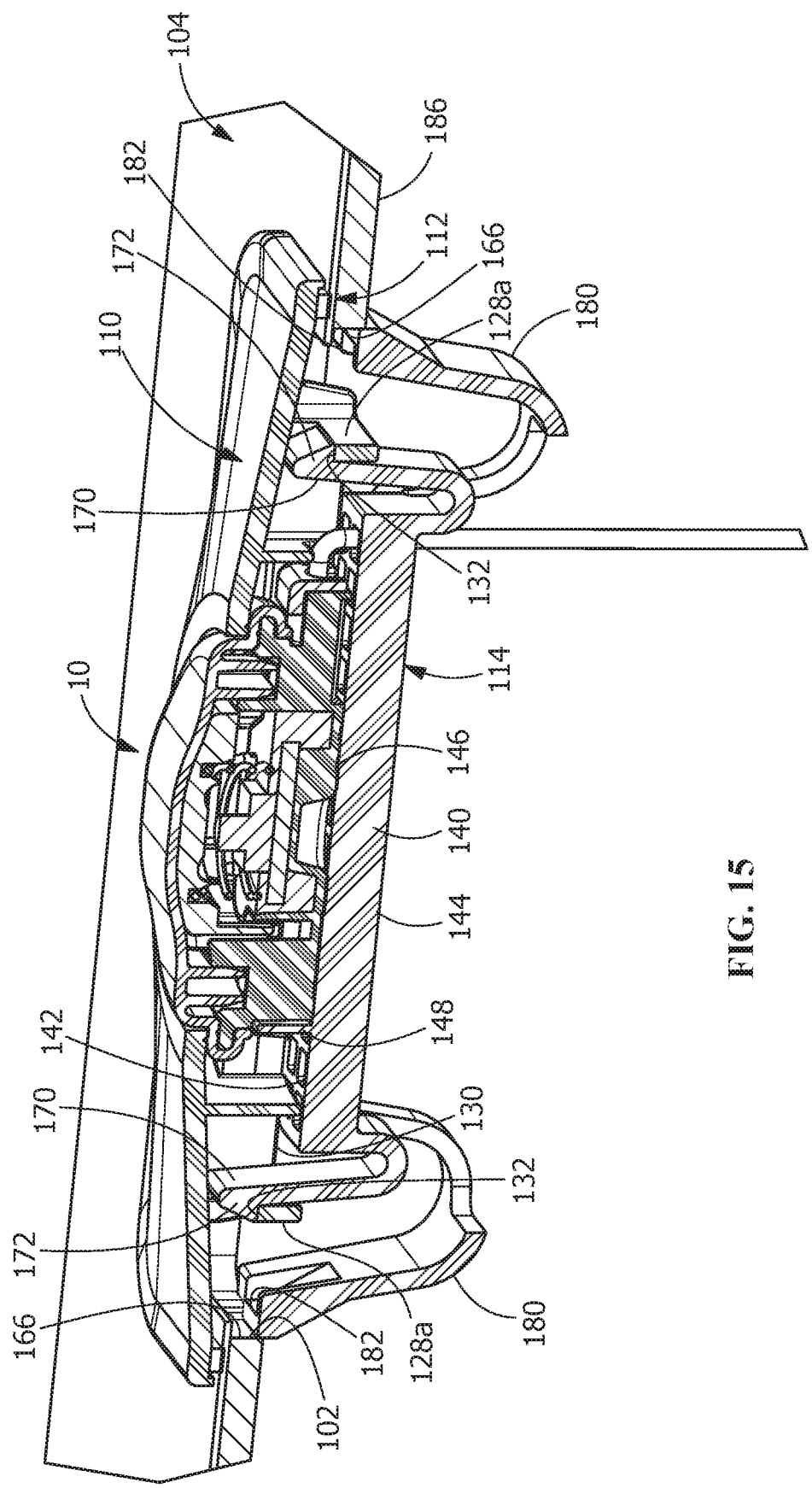
FIG. 15 is a cross-section view of the sealed handle and the mounting adapter mounted in the opening of the panel taken along the longitudinal axis of the mounting adapter.

Referring to FIGS. 14 and 15, the mounting bracket 114 has a planar base 140 having a first surface 142 and an oppositely facing second surface 144. A release assembly receiving area 146 is provided on the first surface 142 of the base 140. The release assembly receiving area 146 has a first positioning member 148 and one or more second positioning members 150. The first positioning member 148 and the second positioning members 150 extend from the first surface 142 of the bracket 114 in a direction away from the second surface 144 of the bracket 114. The first positioning member 148 and the second position members 150 are spaced apart to cooperate with the sealed trunk or tailgate opening assembly 10 to prevent the sealed trunk or tailgate opening assembly 10 from moving in a direction which is parallel to the first surface 142 of the bracket 114. As shown in FIG. 14, the first positioning member 148 has an arcuate or curved surface 152. The shape of the arcuate or curved surface 152 is approximately similar to the configuration of the end walls 38 of the of the housing 24 of the sealed trunk or tailgate opening assembly 10, thereby facilitate the positioning and retention of the sealed trunk or tailgate opening assembly 10 in the release assembly receiving area 146. The second position members 150 have surfaces 151 which cooperates with an opposed end wall 38 of the of the housing 24 of the sealed trunk or tailgate opening assembly 10, thereby also facilitating the positioning and retention of the sealed trunk or tailgate opening assembly 10 in the release assembly receiving area 146. The surfaces 151 may have a curved or flat configuration.

Resilient mounting projections 154 extend from the second surface 144 of the bracket 114 proximate side walls 156. The resilient mounting projections 154 have a general U-shape as viewed in FIGS. 14 and 16. Latching projections 158 are provided proximate free ends 160 of the resilient mounting projections 154. The free ends 160 extend above the first surface 142 of the bracket 114. As shown in FIG. 16, the latching projections 158 cooperate with bottom wall 186 proximate the opening 102 of the panel 104 of the vehicle to mount the adapter 100 in the opening 102 of the vehicle.

As shown in FIG. 14, a keying projection 164 extends from a respective side walls 156 of the bracket 114. The keying projection 164 is configured to cooperate with a keying area 106 of the opening 102 of the vehicle to prevent the adapter 100 from being improperly mounted to the vehicle. The number, positioning and configuration of the keying projection 164 and keying area may vary without departing form the scope of the invention.

As shown in FIGS. 14 and 15, resilient cover retaining projections 170 extend from opposite end walls 166 of the bracket 114. The resilient cover retaining projections 170 have a general U-shape with latching surfaces or projections 172 provided proximate free ends 174 of the resilient cover retaining projections 170. The free ends 174 extend above the first surface 142 of the bracket 114. As shown in FIG. 15, the latching projections 172 cooperate with the shoulders 132 of the mounting members 126 of the cover 110 to properly position and secure the cover 110 to the bracket 114.

As shown in FIGS. 14 and 15, resilient panel engagement arms 180 extend from opposite end walls 166 of the bracket 114. The resilient panel engagement arms 180 have a general U-shape with panel engagement surfaces 182 provided proximate free ends 184 of the resilient panel engagement arms 180. The free ends 184 extend above the first surface 120 of the bracket 114.

As shown in FIG. 15, the panel engagement surfaces 182 of the resilient panel engagement arms 180 are spaced further from the end walls 166 of the bracket 114 than are the latching projections 172 of the resilient cover retaining projections 170. The panel engagement surfaces 182 cooperate with a bottom surface of the panel 104 of the vehicle to properly position and secure the mounting adaptor 100 to the panel 104.

In use, the seal 112 is mounted on the cover 110 by means of an adhesive or the like. The tailgate or trunk release assembly 10 is positioned in the release assembly receiving area 146 of the base 140. tailgate or trunk release assembly 10 is positioned between and cooperates with the first positioning member 148 and the second position members 150 to properly position the tailgate or trunk release assembly 10 relative to the bracket 114 and to prevent the sealed trunk or tailgate opening assembly 10 from moving in a direction which is parallel to the first surface 120 of the bracket 114.

With the tailgate or trunk release assembly 10 properly positioned relative to the bracket 114, the cover 110, with the seal 112 attached, is moved onto the bracket 114. As this occurs, the resilient cover retaining projections 170 of the bracket 114 are moved into the retaining projection receiving openings 130 of the mounting members 126 of the cover 110. This facilitates the cover 110 being properly positioned relative to the bracket 114. As the insertion of the cover 110 onto the bracket 114 continues, the free ends 174 of the resilient cover retaining projections 170 are resiliently deformed by the side walls 128 of the mounting members 126. Insertion continues until the latching surfaces 172 of the resilient cover retaining projections 170 move past the shoulders 132 of the side walls 128 of the mounting members 126, which allows the free ends 174 of the resilient cover retaining projections 170 to return toward their unstressed position. In this position, the latching surfaces 172 cooperate with the shoulders 132 to prevent the unwanted removal of the cover 110 from the bracket 114.

With the cover 110 secured to the bracket 114, the second surface 122 of the cover 110 proximate the tailgate or trunk release assembly receiving opening 124 engages the housing retaining member 98 of the tailgate or trunk release assembly 10 to retain the tailgate or trunk release assembly 10 in position between the cover 110 and the bracket 114 and to provide a seal between the cover 110 and the tailgate or trunk release assembly 10 to prevent the ingress of moisture or other contaminants.

With the mounting adapter 100 properly assembled and the tailgate or trunk release assembly 10 positioned therein, the mounting adapter 100 is moved into the opening 102 of the panel 104 of the vehicle. As this occurs, the cooperation of the keying area 106 of the opening 102 and the keying projection 164 of the mounting adapter 100 prevents the mounting adaptor 100 and the tailgate or trunk release assembly 10 from being positioned at an improper orientation.

With the keying area 106 of the opening 102 and the keying projection 164 of the mounting adapter 100 properly aligned, the mounting adapter 100 is inserted into the opening 102. As this occurs, the resilient panel engagement arms 180 are moved into the opening 102, causing the free ends 184 of the resilient panel engagement arms 180 to be resiliently deformed by the side walls 162 of the opening 102. Insertion continues until the free ends 184 of the resilient panel engagement arms 180 move past the side walls 162 of the opening 102, which allows the free ends 184 of the resilient panel engagement arms 180 to return toward their unstressed position, allowing the panel engagement surfaces 182 of the resilient panel engagement arms 180 to be positioned under the panel 104, as shown in FIG. 16. As this occurs, the cover 110 becomes slightly deformed, as, prior to the mounting adaptor 100 being inserted into the opening 102, the space between the panel engagement surfaces 182 at the free ends 184 of the resilient panel engagement arms 180 and the second surface 122 of the cover 110 is less than the thickness of the panel 104. As the insertion is stopped, the cover 110 returns toward its unstressed position, causing the panel engagement surfaces 182 of the resilient panel engagement arms 180 to be moved into engagement with, and exert a force on the panel 104 to retain and secure the mounting adapter 100 in position on the panel 104. Additional securing, such as adhesive or sealant, may be provided to further secure the mounting adapter 100 to the panel 104.

The present invention, as illustrated in the embodiment shown, provides for a compact sealed trunk or tailgate opening assembly which prevents moisture, dirt and other contaminants from entering the sealed tailgate handle, thereby preventing failure of the sealed tailgate handle.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:
1. A trunk or tailgate opening assembly comprising:
   a sealed handle assembly comprising:
   a housing;
   a circuit board positioned in the housing;
   a switch positioned in the housing, the switch configured to complete an electrical circuit path on the circuit board;

resin material encompassing the circuit board, the resin material configured to seal the connection between the circuit board and the switch;
an adapter, the adapter comprising:
a planar bracket;
a cover;
a seal;
the planar bracket having a sealed handle assembly receiving area, resilient mounting projections extending from the bracket to mount the adapter in an opening of the vehicle, resilient cover retaining projections extending from opposite ends of the bracket to mount the cover to the bracket, and resilient panel engagement arms extending from opposite ends of the bracket, the resilient cover retaining projections having a u-shape with latching surfaces provide proximate free ends of the resilient cover retaining projections, the free ends of the resilient cover retaining projections extending above the first surface of the base, the resilient panel engagement arms having a u-shape with panel engagement surfaces provide proximate free ends of the resilient panel engagement arms, the free ends of the resilient panel engagement arms extending above the first surface of the base, the panel engagement surfaces being spaced further from the ends of the base then the resilient cover retaining projections, wherein the resilient panel engagement arms are resiliently deformed and cooperate with a panel of the vehicle when the adapter is fully inserted into the opening of the vehicle.

2. The trunk or tailgate opening assembly as recited in claim 1, wherein a keying projection extends from the bracket of the adapter, the keying projection is configured to cooperate with a keying area of the opening of the vehicle to prevent the adapter from being improperly mounted to the vehicle.

3. The trunk or tailgate opening assembly as recited in claim 1, wherein the resilient mounting projections extend from side walls of the bracket, the resilient mounting projections cooperate with side walls of the opening to position the adapter in the opening.

4. The trunk or tailgate opening assembly as recited in claim 3, wherein the latching projections of the resilient mounting projections cooperate with an opening of the vehicle to mount the adapter in the opening of the vehicle.

5. The trunk or tailgate opening assembly as recited in claim 4, wherein the cover has mounting members with latching shoulders, the latching shoulders engage the latching members of the resilient cover retaining projections to retain the cover in position on the bracket.

6. The trunk or tailgate opening assembly as recited in claim 1, wherein the cover has an assembly receiving opening for receiving a portion of the sealed handle assembly.

7. The trunk or tailgate opening assembly as recited in claim 1, wherein a first positioning member and a second positioning member are positioned on the bracket, the first positioning member and the second positioning member extend from a first surface of the bracket in a direction away from a second surface of the bracket, the first positioning member and the second position member cooperate with the sealed handle assembly to prevent the sealed handle assembly from moving in a direction which is parallel to the first surface of the bracket.

* * * * *